March 12, 1940. Ö. RISZDORFER 2,193,325
APPARATUS FOR LIGHT CONTROL
Filed May 29, 1937
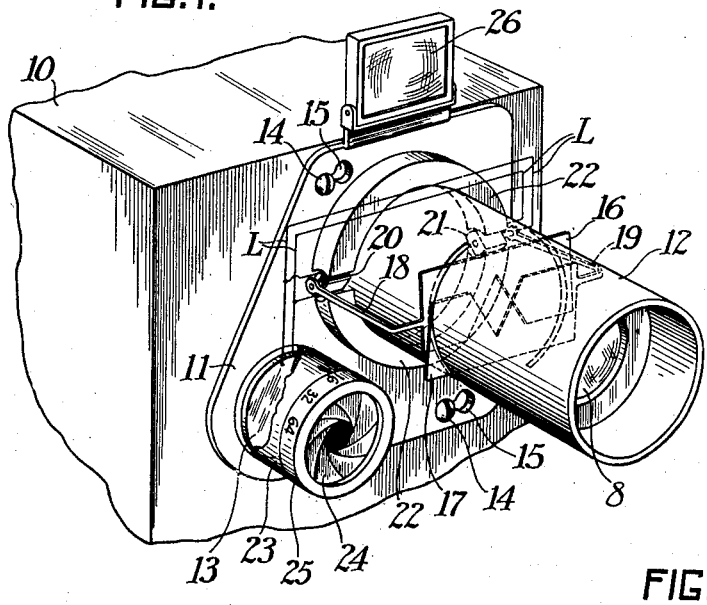
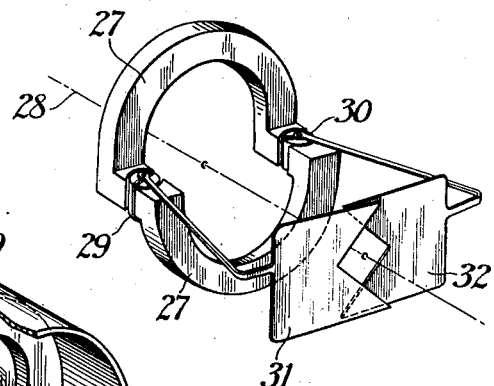
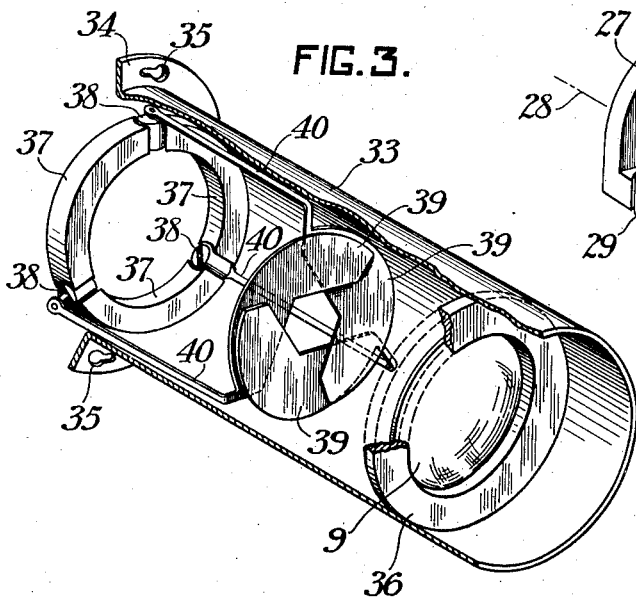
Ödön Riszdorfer
INVENTOR.
BY
ATTORNEYS Patented Mar. 12, 1940

2,193,325

UNITED STATES PATENT OFFICE 2,193,325

APPARATUS FOR LIGHT CONTROL

Ödön Riszdorfer, Budapest, Hungary

Application May 29, 1937, Serial No. 145,574
In Hungary March 16, 1934

1 Claim. (Cl. 95—64)

This invention relates to apparatus for the control of light in making photographic exposures and, more particularly, to photoelectric apparatus for regulating the adjustment of camera exposure control devices to assure proper exposure under different lighting conditions.

This application is a continuation-in-part of my copending application Serial No. 11,367, filed March 15, 1935.

I have previously described photographic apparatus in which a predetermined reading of a light-sensitive device indicates that the camera is set for proper exposure. It is an object of the present invention to provide apparatus in which the light-sensitive device automatically adjusts one of the camera exposure control devices, such as the diaphragm so that the operator, who will have previously adjusted the apparatus in accordance with a predetermined setting of one of the exposure control devices, may proceed to photograph a scene without making any readings or adjustments immediately preceding the exposure. Such apparatus is particularly adapted for use on motion picture cameras with which the great majority of exposures are taken at a fixed shutter speed.

A further object of the invention is the provision of automatic diaphragm adjusting apparatus which is adjustable for the speed or type of photographic material employed, which adjustment may be made when the camera is loaded and does not need any further attention from the operator which might distract him immediately prior to taking the pictures which normally absorb his entire interest and attention.

A further object of the invention is to provide exposure control apparatus particularly adapted for use with interchangeable lenses differing in focal length with which, as is well known, different exposures are required for the same lighting conditions.

A still further object of the invention is to provide interchangeable lenses which are, themselves, provided with automatic exposure control apparatus calibrated to the particular lens system to which they are permanently attached.

Other objects and advantages of my invention will become apparent from the following description when read in connection with the accompanying drawing in which, Fig. 1 is a partial view in perspective of a camera fitted with a photoelectric diaphragm adjusting device;

Fig. 2 shows a modified diaphragm actuating arrangement of the type shown in Fig. 1, and, Fig. 3 is a perspective view in section with certain parts omitted of a lens tube provided with an automatic photoelectric diaphragm adjusting mechanism.

Fig. 1 shows a photographic apparatus in the form of a camera 10, which may be an ordinary motion picture camera, and which is provided with exposure control apparatus embodying one form of the invention. A base plate 11 carrying a lens tube 12 and a light-sensitive cell 13 is secured to the front wall of the camera 10 in any suitable manner and is here shown detachably secured thereto by means of a bayonet lock comprising pins 14 and their cooperating slots 15. The lens tube 12 for a camera objective 8 is modified to accommodate movable diaphragm vanes 16 and 17 in the diaphragm plane of the objective. These vanes 16 and 17 are carried respectively by arms 18 and 19 attached to coils 20 and 21 which are mounted in any suitable well known manner between the poles formed by two semi-circular magnets 22 arranged coaxially with respect to the lens tube 12. The two coils, 20 and 21, are directly connected by leads L to the light-sensitive cell 13 which is suitably mounted on the base plate 11 and, accordingly, the connection between the cell 13 and the coils 20 and 21 need never be disturbed. In this figure only two diaphragm vanes are employed, each of which is provided with a V-shaped notch. These notches cooperate to provide a diamond-shaped opening, the size of which will depend upon the position of coils 20 and 21 as determined by the current flowing through them. Inspection of Fig. 1 will show that the vanes 16 and 17 move toward and away from each other in a vertical direction to increase or decrease the area of the quadrangular opening which furnishes the diaphragm opening for the objective 8. These vanes will always be given equal movement so that the opening or diaphragm aperture will always be symmetrical with respect to the center line of the lens tube which is, of course, the optic axis of the objective 8 carried thereby.

The cell 13 is preferably provided with a protruding cylindrical member 23 upon the outer end of which is mounted a suitable means such as a diaphragm 24 for governing the transmission of light to the cell 13. The diaphragm 24 is provided with an ordinary adjusting ring 25 which may be calibrated or marked in accordance with different camera speeds or film speeds, as desired. If desired, the base plate 11 may also be used to support a suitable finder lens 26 so that when the lens tube 12 is attached to the camera 10, the finder will have a field lens 26 which is suited to the focal length of the objective 8 carried by the lens tube 12.

The electrical instrument for actuating the vanes forming the diaphragm can be designed so that they move horizontally rather than vertically and one such arrangement is shown in Fig. 2. In this embodiment the semi-circular magnet members 27 which encircle the optic axis 28 have their poles deflected by 90° relatively to the plane perpendicular to this optic axis and are facing each other so that the axes of coils 29 and 30 positioned between these poles are arranged in vertical position. In consequence thereof the two screening members 31 and 32, carried and actuated by the coils 29 and 30, move in a horizontal direction.

The modified embodiment of the invention, shown in Fig. 3, provides a lens tube incorporating the complete light-sensitive device employed for adjusting the diaphragm. The lens tube 33 is provided at its rear end with a flange 34 which is provided with means such as slots 35 for detachably securing the lens tube to a camera. Arranged within the tube and in spaced relation to accommodate the objective lens, only the front element 9 is shown, are the three essential elements of the diaphragm adjusting device. Near the forward end of the tube 33 is secured a light-sensitive cell 36 which is in annular form so as not to obstruct light falling on the objective. I preferably mount the cell 36 sufficiently remote from the end of the tube 33 so that the tubular projection forms a hood which limits the angle of the cone of light incident on the photo-cell 36. As shown in this figure the diaphragm actuating mechanism includes three magnets 37 forming the annular field structure for the moving coils 38, each of which has a diaphragm plate 39 secured thereto by suitable arms 40. The three diaphragm plates 39 have their V-shaped notches cooperating to form an aperture for the passage of light through the objective which will be approximately circular since it will always have the shape of a regular hexagon.

It is to be understood that in all of the figures I have purposely made the showing largely diagrammatic or schematic, with some parts in section and some such as the objective lens elements omitted, so that the real features of the invention may be clear. The present showing is, however, sufficient to enable anyone skilled in the art to make and use the invention.

The several embodiments of the invention which have been described are not dependent upon their specific individual features and many other similar designs will readily occur to one skilled in this art. The compact arrangement provided by the invention makes it feasible to provide interchangeable lenses with individual diaphragm adjusting apparatus and also makes it a simple matter to provide existing cameras with automatic exposure control apparatus.

What I claim as new and desire to secure by Letters Patent of the United States is:

In an automatic diaphragm for use with the lens of a camera, an electrical measuring apparatus having a plurality of moving coils and means forming a single magnetic circuit cooperating with all of said moving coils, and a diaphragm blade actuated by each of said moving coils, the inner edges of said diaphragm blades cooperating to define an approximately circular aperture when said moving coils displace the respective diaphragm blades into positions corresponding to the full diameter opening of the camera lens.

ÖDÖN RISZDORFER.